US011393313B2

(12) United States Patent
Lin et al.

(10) Patent No.: US 11,393,313 B2
(45) Date of Patent: Jul. 19, 2022

(54) SMART HEIGHT SAFETY SYSTEM

(71) Applicant: HONEYWELL INTERNATIONAL INC., Morris Plains, NJ (US)

(72) Inventors: Frank Lin, Shanghai (CN); Wei Zhang, Shanghai (CN); Jennifer Shen, Shanghai (CN); Anbo Sun, Shanghai (CN); Zhiqiang Liu, Shanghai (CN); Pinghua Jiang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 165 days.

(21) Appl. No.: 16/315,227

(22) PCT Filed: Oct. 27, 2017

(86) PCT No.: PCT/CN2017/107990
§ 371 (c)(1),
(2) Date: Jan. 4, 2019

(87) PCT Pub. No.: WO2019/080089
PCT Pub. Date: May 2, 2019

(65) Prior Publication Data
US 2021/0358282 A1 Nov. 18, 2021

(51) Int. Cl.
*G08B 21/02* (2006.01)
*A62B 35/00* (2006.01)
(Continued)

(52) U.S. Cl.
CPC .......... *G08B 21/02* (2013.01); *A62B 35/0075* (2013.01); *G01C 5/00* (2013.01);
(Continued)

(58) Field of Classification Search
CPC ...... A62B 35/0075; G01C 5/00; G01D 5/145; G01P 15/00; G08B 21/02; G08B 21/043;
(Continued)

(56) References Cited

U.S. PATENT DOCUMENTS 9,629,399 B2   4/2017  Raanan
2010/0231402 A1*  9/2010  Flynt .................. G08B 19/00
                                            340/679
(Continued)

FOREIGN PATENT DOCUMENTS

CA     2862088 A1   8/2012
CN    102512773 A   6/2012
(Continued)

OTHER PUBLICATIONS

International Search Report and Written Opinion for Application No. PCT/CN2017/107990, dated Jun. 27, 2019, 8 pages.

*Primary Examiner* — Sisay Yacob
(74) *Attorney, Agent, or Firm* — Alston & Bird LLP

(57) ABSTRACT

Apparatus and associated methods relate to a smart hook, a safety harness module (125), and associated electronic components that detect a safety state of a user by monitoring various parameters at the smart hook and safety harness module (125) and determining whether the user is using proper safety protocol at extreme heights and/or whether the user has experienced a height-related accident. In an illustrative example, the user may don a safety harness (115) that may include a module (125) that contains sensors that monitor an acceleration/velocity/position of the user and/or ambient air pressure around the user. The module (125) may receive wireless signals from at least one rebar hook (120a, 120b) having sensors that monitor the acceleration/velocity/position and gate position of the rebar hooks (120a, 120b). A controller included with the safety harness module (125) may use these sensors to advantageously determine the safety state of the user and generate alert/warning signals.

18 Claims, 14 Drawing Sheets

(51) Int. Cl.
*H04Q 9/00* (2006.01)
*G01D 5/14* (2006.01)
*G01C 5/00* (2006.01)
*G01P 15/00* (2006.01)

(52) U.S. Cl.
CPC .............. *G01D 5/145* (2013.01); *G01P 15/00* (2013.01); *H04Q 9/00* (2013.01); *H04Q 2209/40* (2013.01)

(58) Field of Classification Search
CPC ................ G08B 21/0461; G08B 21/24; H04Q 2209/40; H04Q 9/00
See application file for complete search history.

(56) References Cited

U.S. PATENT DOCUMENTS

| | | | | |
|---|---|---|---|---|
| 2013/0076515 A1* | 3/2013 | Flynt | .................. | A62B 35/0025 340/679 |
| 2013/0312168 A1 | 11/2013 | Raana | | |
| 2015/0265860 A1* | 9/2015 | Kennedy | ............ | A62B 35/0075 182/3 |
| 2015/0276521 A1* | 10/2015 | Moore, Jr. | ............. | A62B 35/00 702/41 |
| 2016/0354621 A1* | 12/2016 | Moore, Jr. | ......... | A62B 35/0075 |
| 2017/0193799 A1* | 7/2017 | Holub | ................ | A62B 35/0075 |
| 2017/0224031 A1 | 8/2017 | Raanan | | |
| 2019/0269949 A1* | 9/2019 | Kennedy | ............ | A62B 35/0081 |

FOREIGN PATENT DOCUMENTS

| | | |
|---|---|---|
| CN | 202605566 U | 12/2012 |
| CN | 103893933 A | 7/2014 |
| CN | 104800988 A | 7/2015 |
| EP | 2670632 A2 | 12/2013 |
| JP | 61-080941 A | 4/1986 |
| JP | 2014-514462 A | 6/2014 |
| WO | 2012/104833 A2 | 8/2012 |

* cited by examiner

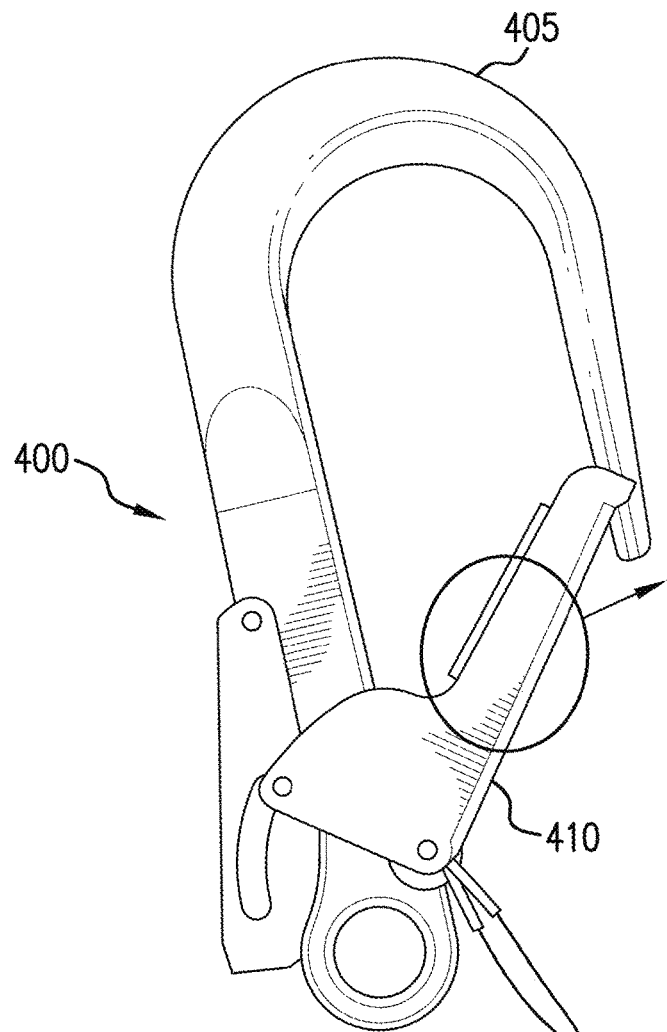
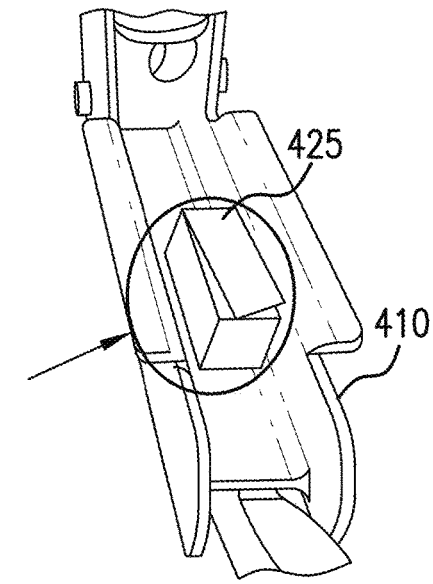
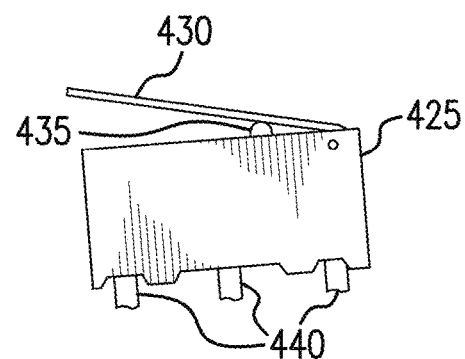
FIG. 4A
FIG. 4B
FIG. 4C

SMART HEIGHT SAFETY SYSTEM

TECHNICAL FIELD

Various embodiments relate generally to personal protective equipment.

BACKGROUND

Workers who perform construction, repairs, and maintenance high above the ground expose themselves to a number of risks. For example, a maintenance worker climbing up a cell tower may reach heights of 200, 400, 500, or more feet. Falling from such heights can result in severe if not fatal injuries to the worker. Various types of protection and safety equipment have been developed to reduce the risk associated with working at such extreme heights.

One such type of safety equipment is a body safety harness. A worker may don a safety harness that may have coupling members to anchor the worker to a fixed point when working at extreme heights. For example, a safety harness may be coupled to a double lanyard that may have hooks that can releasably attach the worker to a stable beam or structure. When a safety worker uses the double lanyard hooks correctly, the worker may significantly reduce the risk of a height-related injury.

SUMMARY

Apparatus and associated methods relate to a smart hook, a safety harness module, and associated electronic components that detect a safety state of a user by monitoring various parameters at the smart hook and safety harness module and determining whether the user is using proper safety protocol at extreme heights and/or whether the user has experienced a height-related accident. In an illustrative example, the user may don a safety harness that may include a module that contains sensors that monitor an acceleration/velocity/position of the user and/or ambient air pressure around the user. The module may receive wireless signals from at least one rebar hook having sensors that monitor the acceleration/velocity/position and gate position of the rebar hooks. A controller included with the safety harness module may use these sensors to advantageously determine the safety state of the user and generate alert/warning signals.

Various embodiments may achieve one or more advantages. For example, some embodiments may remind a user that they are not properly using the rebar hooks, for example, by activating a buzzer or alarm on the user's safety harness. A warning/alert signal indicative of improper use of the rebar hooks may be sent from the safety harness module to a remote computing device of a supervisor, advantageously notifying them that their worker is not abiding by proper safety protocol. Safety infractions may be recorded in a database so the supervisor can easily monitor statics and identification of which workers are consistently violating proper safety measures at elevation. In some examples, if it has been determined that a user has been involved in an accident (e.g., has fallen), an emergency signal may automatically be generated and sent to a hospital or other emergency response service so that immediate assistance can be given to the user. In some embodiments, various data signals may be sent wirelessly, thus avoiding any potential danger associated with a user being hindered by wired connections. In various embodiments, real-time data may be transmitted from the safety harness module to a remote computing device that may advantageously allow for real-time monitoring of users as they are working on a cell tower or other tall structure.

The details of various embodiments are set forth in the accompanying drawings and the description below. Other features and advantages will be apparent from the description and drawings, and from the claims.

BRIEF DESCRIPTION OF THE DRAWINGS

FIGS. 4A, 4B, 4C, and 4D depict various views of an exemplary smart rebar hook along with an exemplary microswitch.

Like reference symbols in the various drawings indicate like elements.

DETAILED DESCRIPTION OF ILLUSTRATIVE EMBODIMENTS

Figure 1:
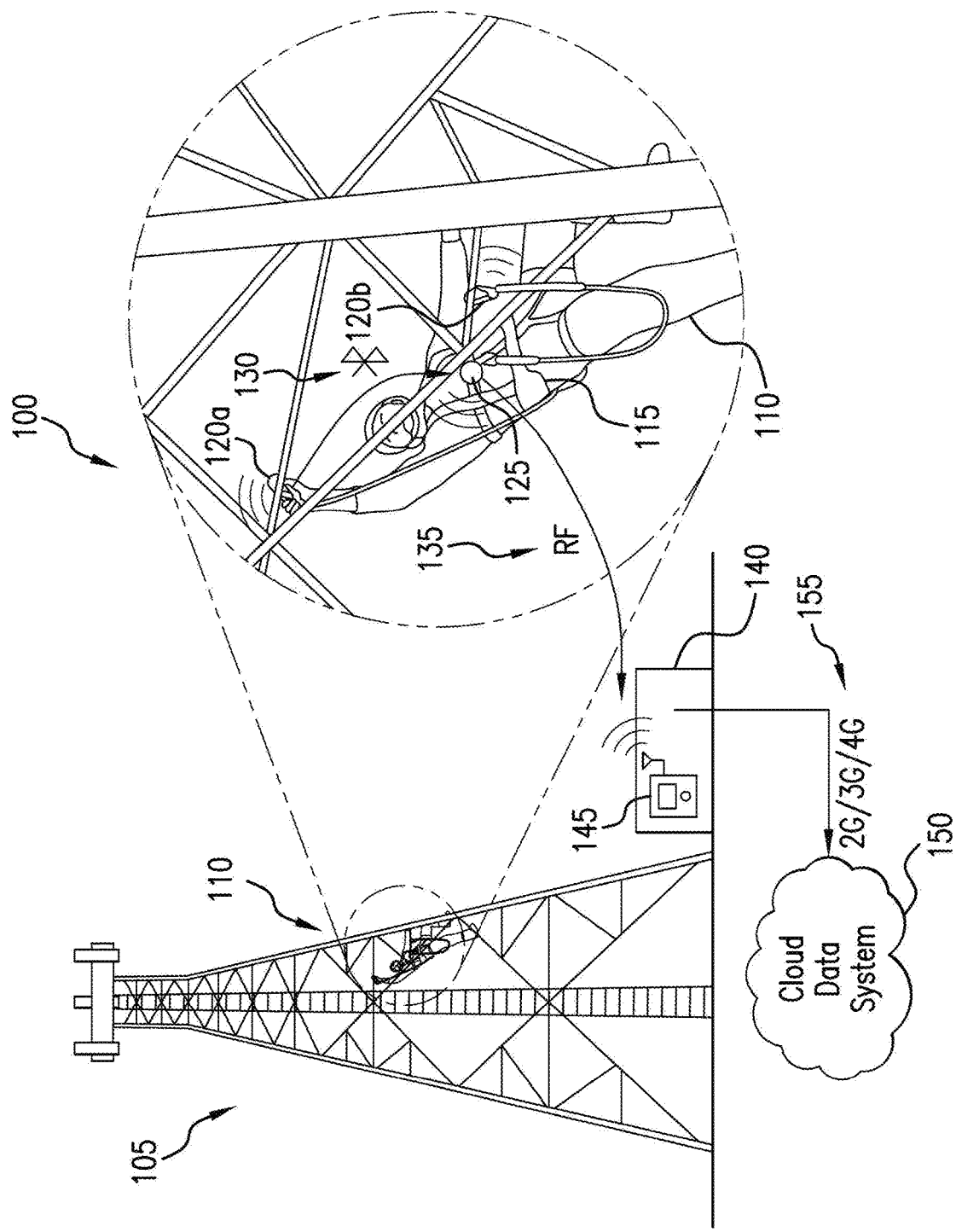
FIG. 1 depicts a perspective view of an exemplary radio tower scenario for an exemplary smart safety harness and exemplary smart rebar hooks.

FIG. 1 depicts a perspective view of an exemplary radio tower scenario for an exemplary smart safety harness and exemplary smart rebar hooks. A use case scenario 100 has a setting of a radio station tower 105. The radio station tower 105 is shown with a worker 110 climbing up the tower 105 to perform routine maintenance on the tower 105. The worker 110 is wearing a safety harness 115 that is used to prevent falling accidents when the worker 110 is on the tower 105. Coupled to the safety harness 115 are two rebar hooks 120a and 120b. In the illustration of FIG. 1, the worker 110 is selectively attaching the two rebar hooks 120a and 120b to various anchor points on the tower 105. If the worker 110 is anchored to the tower 105 via the rebar hooks and a fall occurs, the worker 110 will only fall a limited distance, thus preventing serious injury to the worker 110. The rebar hooks 120a and 120b include various electronic components that may measure various parameters used to determine the state of the rebar hooks 120a and 120b.

Disposed on the safety harness 115 is a module 125. The module 125 includes various electronic components that may measure various parameters used to determine the state of the worker 110. These measurements may advantageously be used in determining whether the worker 110 is moving vertically or horizontally, or whether the worker 110 has had an accident, such as falling off of the tower 105. The module 125 also includes a receiver that can receive wireless data signals. For example, the rebar hooks 120a and 120b may include a transmitter that may transmit data to the receiver of the module 125. The module 125 may also include a transmitter that can transmit wireless data signals to a remote computing device.

In some embodiments, the rebar hooks 120a and 120b may transmit signals to the module 125 via a wireless (e.g., Bluetooth) connection 130. In various examples, the module 125 may transmit signals via a wireless (e.g., radio frequency) link 135 to a ground station 140. The ground station 140 includes a remote computing device 145 that receives the wireless signals transmitted from the module 125. For example, the data collected at the rebar hooks 120a and 120b may be transmitted to the module 125. The module 125 then forwards this data, along with data as measured at the module 125, to the remote computing device 145. These data transmissions may advantageously allow a supervisor using the remote computing device 145 to monitor the state of the worker 110 as they are maneuvering and performing repairs on the tower 105.

The remote computing device 145 may communicate with a cloud data system 150 via a data link 155 (e.g., 2G, 3G, or 4G wireless standard). Data measured at the rebar hooks 120a and 120b and the module 125 may be forwarded to the cloud data system 150, which may log this data in a database. In some embodiments, the module 125, the remote computing device 145, and/or the cloud data system 150 may perform various processing steps on the data collected at the rebar hooks 120a and 120b and the module 125. For example, the module 125 may perform calculations on data received from the rebar hooks 120a and 120b to determine whether the worker 110 is properly using the rebar hooks 120a and 120b. In some examples, the remote computing device 145 may use the data collected at the module 125 and the rebar hooks 120a and 120b to determine whether the worker 110 has had an accident. If the remote computing device 145 determines that the worker has fallen, the remote computing device 145 may send an alert signal to the cloud data system 150.

It may be very dangerous for the worker 110 to climb the tower 105 without using the rebar hooks 120a and 120b. The worker 110 may give up using the rebar hooks 120a and 120b because using them may significantly decrease the worker's climbing speed. Accordingly, the module 125 may advantageously remind the worker 110 to properly use the rebar hooks 120a and 120b. The rebar hooks 120a and 120b and the module 125 may also monitor the worker 110 to ensure they are using the correct safety operations. The rebar hooks 120a and 120b and the module 125 may be portable and may advantageously operate easily for the worker safety.

The rebar hooks 120a and 120b and the module 125 may remind a user to correctly use a lanyard connected to the safety harness 115. These reminders may be used, for example, when the worker 110 is climbing or descending the tower 105. The worker 110 may use the lanyard coupled to the rebar hooks 120a and 120b as anchor connection when climbing or descending. While the worker 110 is shifting horizontal, at least one rebar hook 120a or 120b may be anchored over the worker's chest point to provide for an adequate fall protection factor. When the worker 110 happens to fall, the module 125 may broadcast a "man-down" signal to apprise a supervisor, for example, that a fall has taken place and that rescue personnel should respond as soon as possible.

Figure 2:
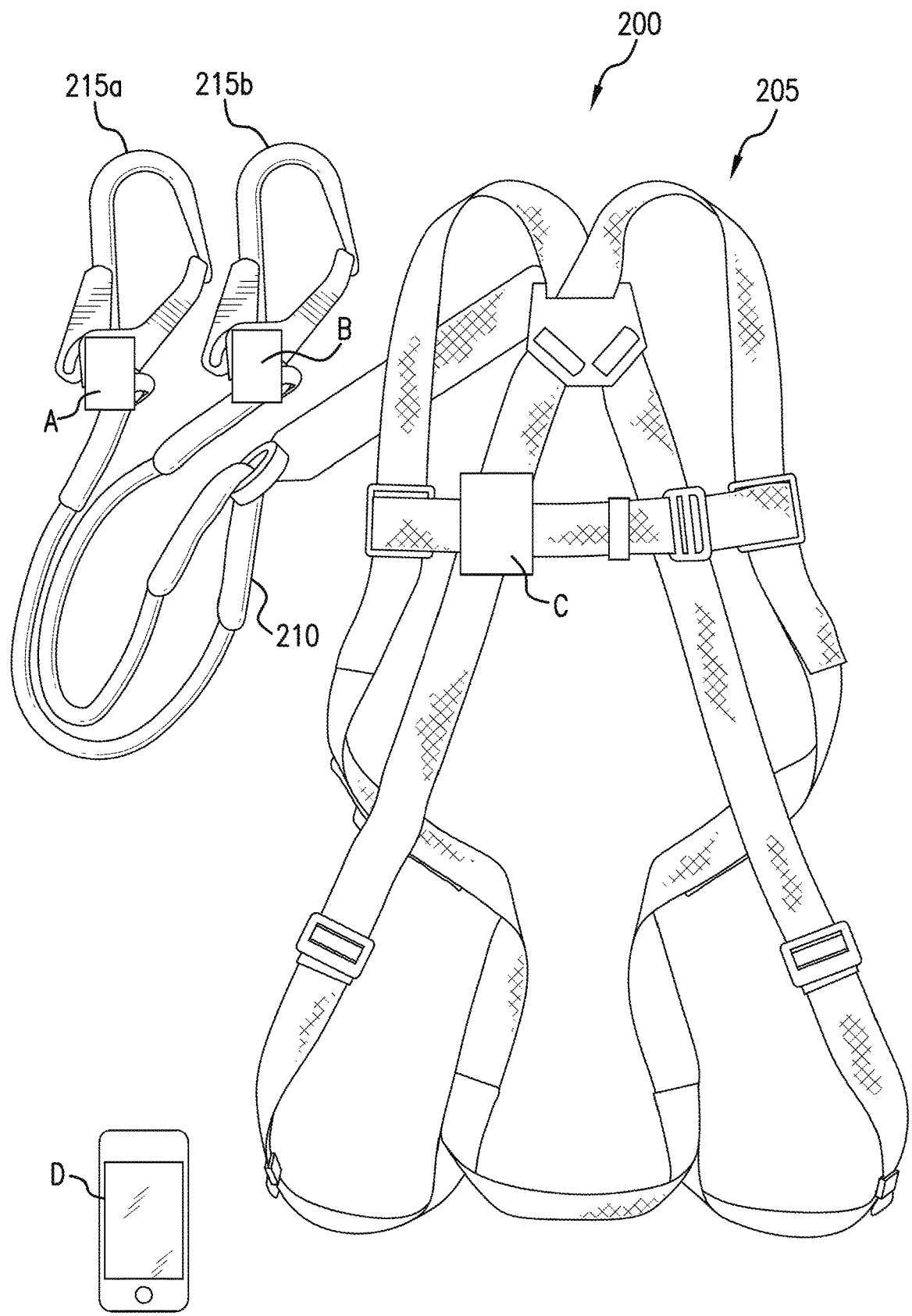
FIG. 2 depicts a front view of an exemplary smart safety harness and smart rebar hooks, along with an exemplary remote computing device.

FIG. 2 depicts a front view of an exemplary smart safety harness and smart rebar hooks, along with an exemplary remote computing device. The smart safety harness system 200 includes a safety harness 205. Disposed on the safety harness 205 is a module C. The module C may have various electronic components to collect, receive, and transmit parametric data. In some embodiments, the module C may be located on the chest section of the safety harness 205. Locating the module C on the chest section of the safety harness 205 may advantageously provide for a central location for the electronic components of the module C to accurately measure the state of a worker wearing the safety harness 205. The module C may also process the data collected at the module C to determine whether a worker wearing the safety harness 205 has fallen.

The safety harness 205 is coupled to a proximal end of a double lanyard 210. The double lanyard 210 has distal ends that couple to respective rebar hooks 215a and 215b. Each rebar hook 215a and 215b has a respective hook module A and B. The hook modules A and B have electronic components to transmit parametric data to the module C. The module C may process this parametric data to determine whether a user is properly using the rebar hooks 215a and 215b.

Remote from the safety harness 205 is a remote device D. The remote device D is a remote computing device configured to receive data signals from the module C. In some examples, the data collected at the modules A, B, and C may be forwarded to remote device D. The remote device D may process this data to determine whether a user is properly using the rebar hooks 215a and 215b, or whether a worker wearing the safety harness 205 has been involved in an accident. In some examples, the remote device D may receive post-processed data from the module C. For example, the module C may itself determine whether a worker wearing the safety harness 205 has fallen, and may send an alert signal to the remote device D if it is determined that a fall has taken place.

The hook modules A and B may be installed in or may be bonded with respective hooks 215a or 215b of the double lanyard 210. The hook modules A and B may include sensors (e.g., gyroscope, Hall-effect sensor, micro-switch) which can be used to detect the state of the hooks 215a or 215b. In some examples, the sensors in the hook modules A or B may detect opening of a hook gate, along with the hook's movement. The hook modules A and B may also possess signal sending functions (e.g., via Bluetooth low energy), as well as a battery to power various electronic components.

The module C may be bonded with the safety harness 205 or sewn into the cloth of the safety harness 205. The module C may include sensors (e.g., gyroscope (9-axis to measure speed/acceleration), air-pressure sensor) which may be used to measure the movement and/or height changes of a worker wearing the safety harness 205. The module C may possess signal receiving/transmission functions to receive data signals from the hook modules A and B and to transmit data signals to the remote device D. The module C may also have a battery and a warning element (e.g., a buzzer) to notify a worker wearing the safety harness 205 that they are not properly using the rebar hooks 215a and 215b. A GPS system may also be included with the module C to track the location of the worker wearing the safety harness 205.

The remote device D may be a remote computing device (e.g., a smart phone). The remote device D may include signal receiving/transmitting functions to receive data signals from the module C, and transmit data signals to a cloud data system. The remote device D may also include an alert/warning function that may notify a user of remote device D. A GPS system may also be included with the remote device D.

Figure 3:
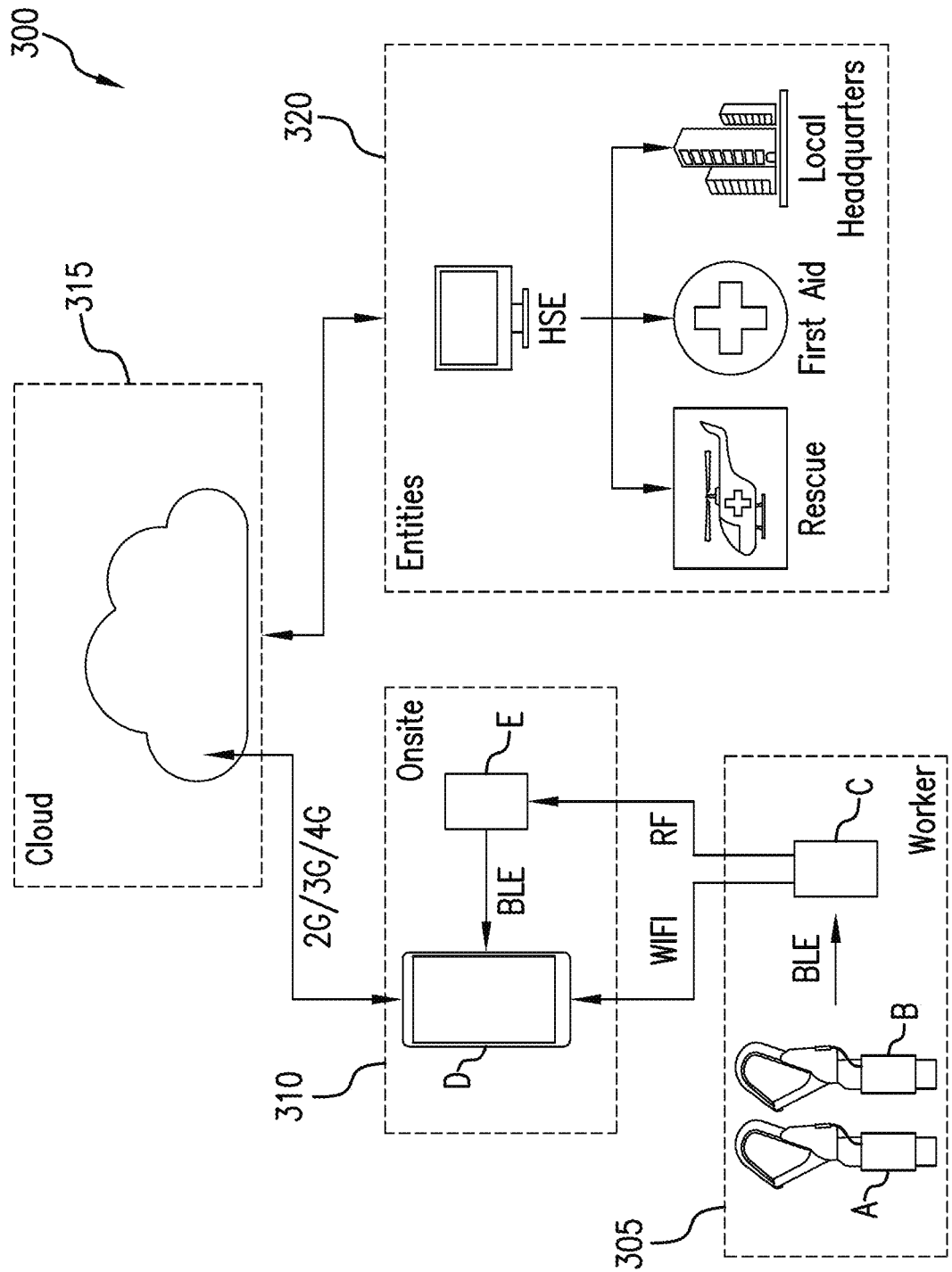
FIG. 3 depicts a block diagram of an exemplary safety monitoring system.

FIG. 3 depicts a block diagram of an exemplary safety monitoring system. A safety monitoring system 300 includes worker equipment 305. The worker equipment 305 may include rebar hooks having respective hook modules A and B. The data collected at hook modules A and B may be transmitted (e.g., via Bluetooth low energy) to a module C. In some examples, the module C is located on a worker's safety harness. In some embodiments, the module C may be attached elsewhere on a worker's body (e.g., helmet, chest, back).

The module C may transmit data to remote devices D and/or E at an onsite location 310. In some examples, the remote device D may be a smartphone. The remote device E may receive data signals from the module C via a WiFi connection. In various examples, the remote device E may be a radio frequency receiver. The remote device E may receive signals from the module C via a radio frequency connection. The remote device E may transmit data signals to the remote device D via, for example, a Bluetooth low energy connection.

The remote device D may communicate with a cloud server 315 (e.g., over 2G, 3G, or 4G). For example, received signals from the module C may be forwarded on to the cloud server 315 via the remote device D. The cloud server 315 may log data received from remote device D in a database. In some examples, the remote device D may transmit warning and/or alert signals to the cloud server 315 if, for example, a worker has fallen on site. In some embodiments, the remote device E may communicate with a cloud server 315.

The cloud server 315 may communicate with various entities 320. For example, the cloud server 315 may send warning or alert signals to a health, safety, and environment (HSE) department. The HSE department may use these warning or alert signals to inform other entities (e.g., rescue, first aid, local HQ) of an accident involving a worker using the worker equipment 305. In some examples, a warning reminder may be sent to the cloud server 315, and the cloud server 315 may inform specific entities 320 about the relevant risk, or the entities 320 may link to the cloud server 315 to be made aware of any updates.

The module C, remote devices D or E, and/or the cloud server 315 may perform any of the following safety functions/calculations: (1) detect if a worker is properly using the double lanyard hooks while climbing or descending; (2) detect if a worker is properly using the rebar hook to protect themselves while shifting horizontally; (3) detect if an accident happens onsite (e.g., man-down); (4) remind a worker to follow proper safety rules; (5) inform an onsite supervisor that a worker is not following the rules; and (6) remind entities of the relevant risks/warnings/alerts.

In addition, various components of the safety monitoring system 300 may perform the following functions: (1) perform fall accident detecting and rescue reminding (e.g., detect if the worker has fallen from a dangerous height); (2) detect use/non-use of lanyard/hooks in climb or descend and warning reminding (e.g., determining if the worker is moving vertically, determining if the rebar hook is opened or not, determining if the rebar hook is being carried with the body or not); (3) detect use/non-use of lanyard/hooks in side move and warning reminder (e.g., detect if the worker is moving horizontally, detect if the rebar hook is being carried with the body or not); (4) transmit data between modules A/B/C/D/E; (5) check the status of the smart safety harness system (e.g., detect the status of transmission issues and battery volume); and (6) warning/alerts on modules C/D/E.

Figure 4D:
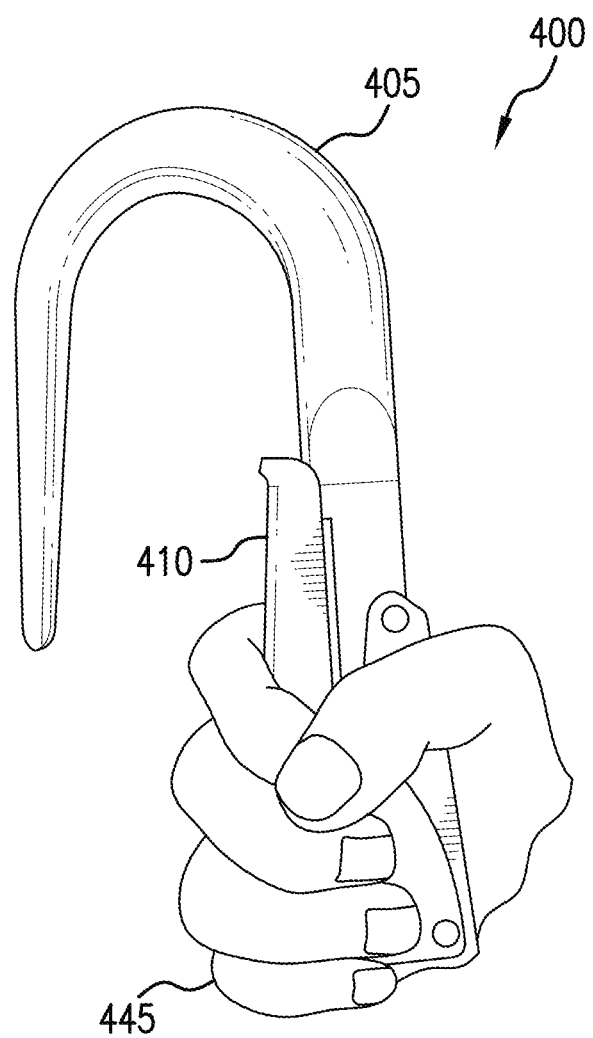

FIGS. 4A, 4B, 4C, and 4D depict various views of an exemplary smart rebar hook along with an exemplary micro-switch. FIG. 4A shows a rebar hook 400 in a "closed" state. The rebar hook 400 includes a hook section 405 and a gate section 410. The gate section 410 is hingedly coupled to the hook section 405, such that a user can selectively open the rebar hook 400 to couple or decouple the rebar hook 400 from an anchor point. The rebar hook 400 includes various electronic components (e.g., switches and/or sensors, such as acceleration sensor) that couple to a transmitter 415 via a wired connection 420. The sensors may collect data pertaining to the state of the rebar hook 400, which may then be transmitted via the transmitter 415 to another location (e.g., to the module C, as described above).

Also included with the rebar hook 400 is a micro-switch 425 that detects the opening/closing of the rebar hook 400, as shown in FIG. 4B. In this illustrative embodiment, the micro-switch 425 is located inside of the gate section 410, such that when the gate section 410 is in an open state (FIG. 4D), the micro-switch 425 is in a first state, and when the gate section 410 is in a closed state (FIG. 4A), the micro-switch 425 is in a second state. Data signals indicative of these first and second states may be transmitted to the transmitter 415, which may forward this state information on to, for example, the module C.

FIG. 4C shows an exemplary micro-switch 425 that includes a pivot plate 430. When the pivot plate 430 is pressed down, it activates a switch 435. The switch 435 is therefore in either the first state (hinge plate shut) or second state (hinge plate open). The state information of the switch 435 may be measured at the electrical leads 440, which may be coupled to the transmitter 415 via the wired connection 420.

Such a configuration may advantageously allow for detection of gate open/closed states of the rebar hook 400. In some examples, the transmitter 415 may receive the state information from micro-switch 425 and send the state information to the module C. In various embodiments, the micro-switch 425 may be bonded inside the gate section 410.

FIG. 4D shows an "open" state of the rebar hook 400. The hook section 405 and the gate section 410 are pressed together by a user's hand 445. When this occurs, the micro-switch 425 (located in the gate section 410) will be in the first state (hinge plate shut) due to engagement with an opposing side of the hook 405. The transmitter 415 may receive an electrical signal indicative of this change in the state of the micro-switch 425, and send the state information to the module C.

In some examples, the sensors and/or switches may be disposed elsewhere on or in the rebar hook 400. For example, the switch may be located on the inside of the hook section 405. A sensor may be integrally formed with the rebar hook 400, to minimize noise due to jiggling.

Figure 5B:
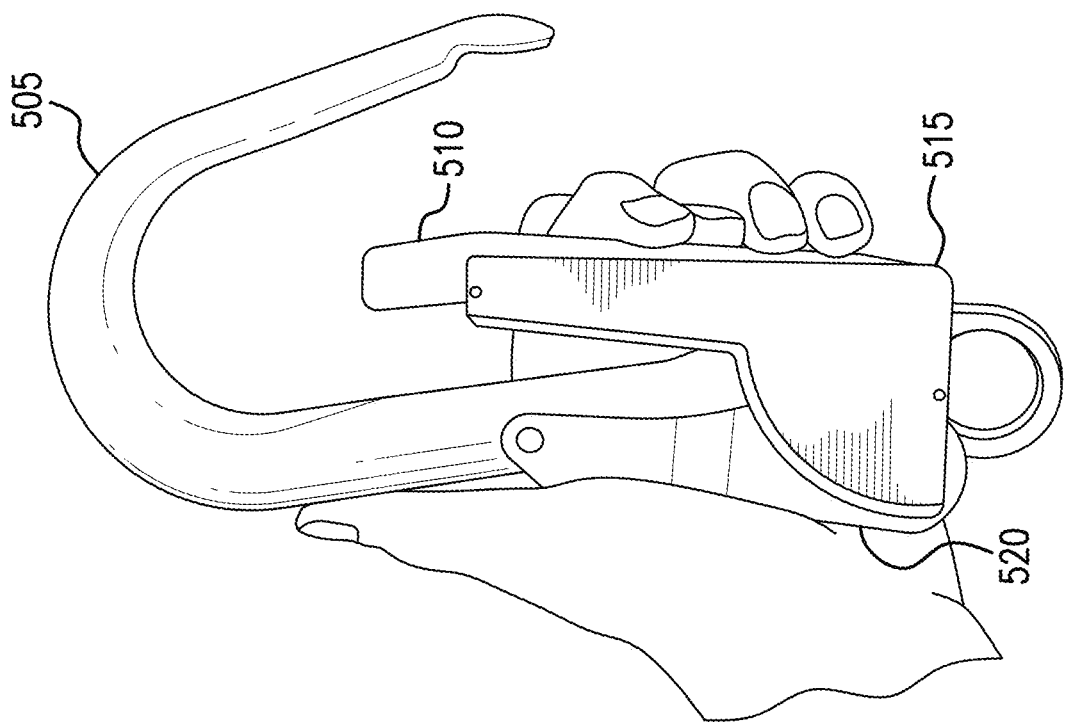
FIGS. 5A and 5B depict side views of an exemplary smart rebar hook having a magnetic field sensor.
Figure 5A:
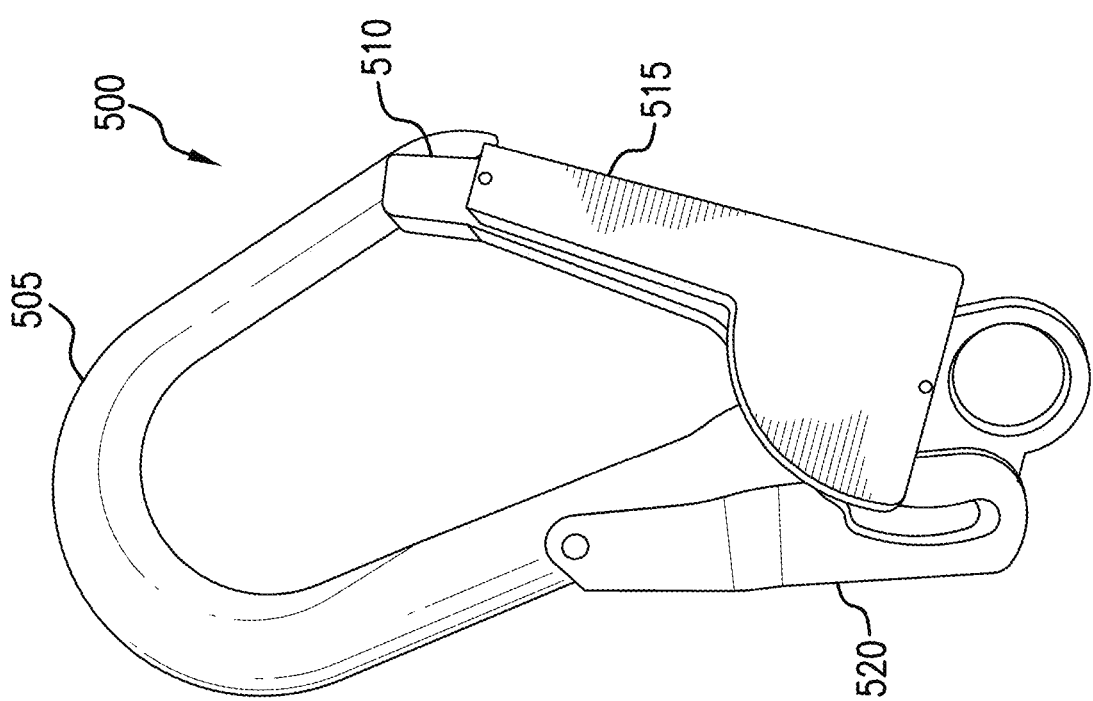

FIGS. 5A and 5B depict side views of an exemplary smart rebar hook having a magnetic field sensor. A rebar hook 500 includes a hook section 505 and a gate section 510 hingedly coupled to the hook section 505. Coupled to both the hook section 505 and the gate section 510 is a hinge plate 520 hingedly coupled to the hook section 505. Located on the gate section 510 is a sensor housing 515. The sensor housing contains a magnetic field sensor/chip (not shown) that can measure the local magnetic field strength. Disposed in or on the hinge plate 520 is a magnetic field generator (not shown). When the rebar hook 500 transitions between a "closed" state (e.g., FIG. 5A) and an "open" state (e.g., FIG. 5B), the magnetic field sensor detects a change in the magnetic field strength due to the magnetic field generator either being far away from, or close to the magnetic field sensor.

Figure 6:
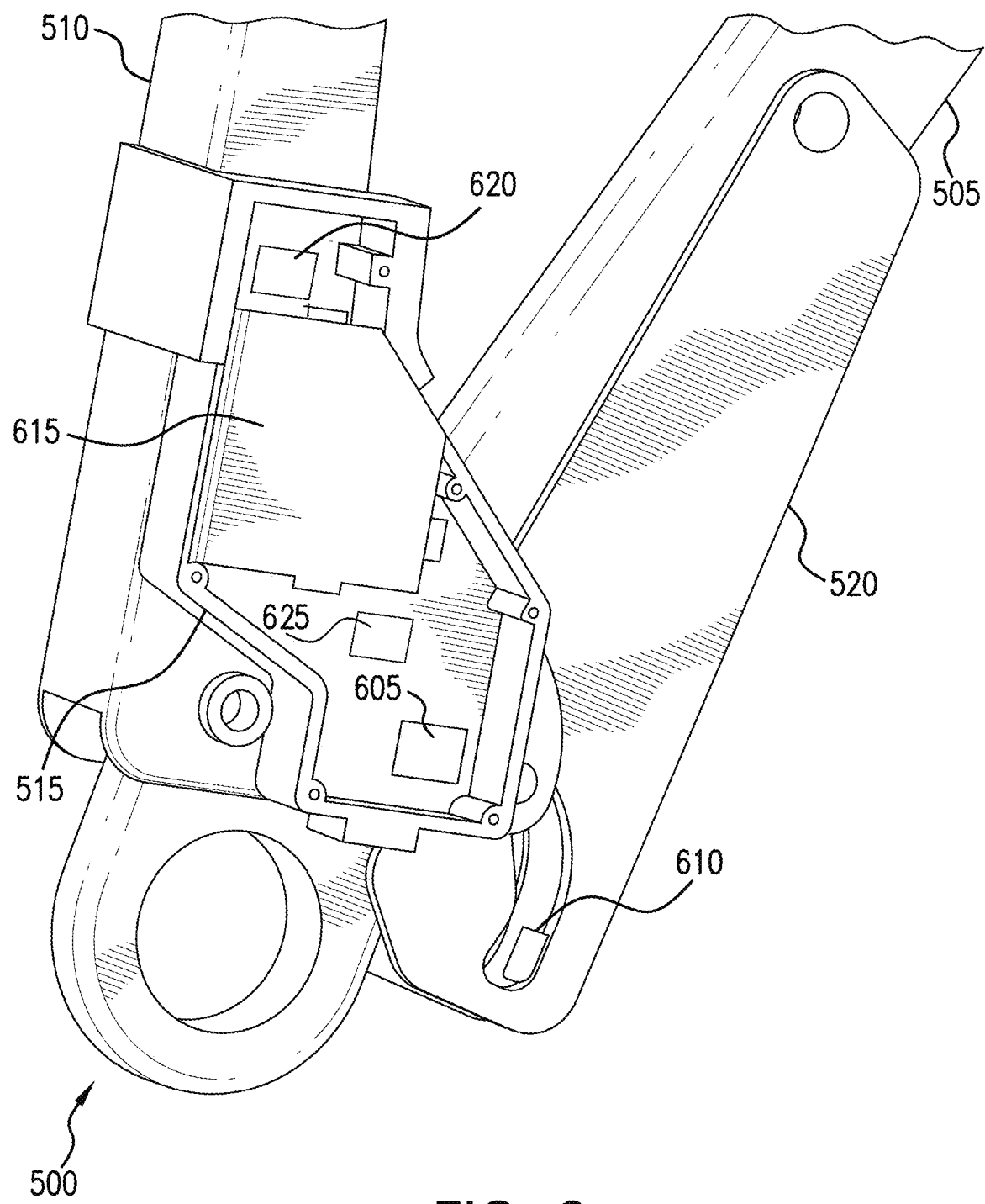
FIG. 6 depicts a perspective zoomed-in view of an exemplary smart rebar hook having a magnetic field sensor.

FIG. 6 depicts a perspective zoomed-in view of an exemplary smart rebar hook having a magnetic field sensor. The rebar hook 500 includes the hook section 505, the gate section 510, the sensor housing 515, and the hinge plate 520 (as described above with respect to FIGS. 5A and 5B).

In this illustrative embodiment, located in the sensor housing 515 is a magnetic field sensor 605. The magnetic field sensor 605 is configured to detect the magnetic field produced by a magnetic field generator 610. In this exemplary depiction, the magnetic field generator 610 is disposed on the bottom inside section of the hinge plate 520. In this configuration, when the gate section 510 is opened, the magnetic field sensor 605 and the magnetic field generator 610 may approach one another, such that the magnetic flux in the vicinity of the magnetic field sensor 605 may measurably increase. This configuration may advantageously detect of the state of the gate section 510 of the rebar hook 500 (e.g., open, closed).

Also located in the sensor housing 515 is an acceleration sensor 620. The acceleration sensor 620 measures the acceleration of the rebar hook 500. The magnetic field sensor 605 and acceleration sensor 620 are electrically coupled to a wireless transmitter 625. The output of the sensors 605 and 620 is communicated to the wireless transmitter 625, which transmits these sensor outputs to another device (e.g., module C). In some examples, the wireless transmitter 625 is a Bluetooth module with a CPU and wireless function. The wireless transmitter 625 may be mounted on a printed circuit board (PCB) that is located within the sensor housing 515. The acceleration sensor 620 may also be mounted on the PCB.

The sensor housing 515 further includes a battery cover 615 for protecting a battery (not shown). The battery may provide power to the magnetic field sensor 605, the acceleration sensor 620, and/or the wireless transmitter 625.

In some embodiments, the magnetic field sensor 605 may not be limited to a specific type of magnetic field sensor. For example, the magnetic field sensor 605 may be any of the following types of magnetic field sensors: Hall effect sensor, magneto-diode, magneto-transistor, AMR magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor, optically pumped magnetic field sensor, fluxgate magnetometer, search coil magnetic field sensor, magneto-resistive sensor, TMR sensor, or SQUID magnetometer.

In various examples, the magnetic field generator 610 may not be limited to a specific type of magnetic field generator. For example, the magnetic field generator 610 may be a permanent magnet, electromagnet, or other magnetizable material.

In some examples, the magnetic field sensor 605, battery, magnetic field generator 610, acceleration sensor 620, and/or the wireless transmitter 625 may be located elsewhere on or in the rebar hook 500. For example, the locations of magnetic field sensor 605 and magnetic field generator 610 may be reversed from the locations depicted in FIG. 6. In some embodiments, the magnetic field sensor 605 may be disposed near the tip of the gate section 510, while the magnetic field generator 610 may be disposed on an opposing inner surface of the hook section 505.

Figure 7:
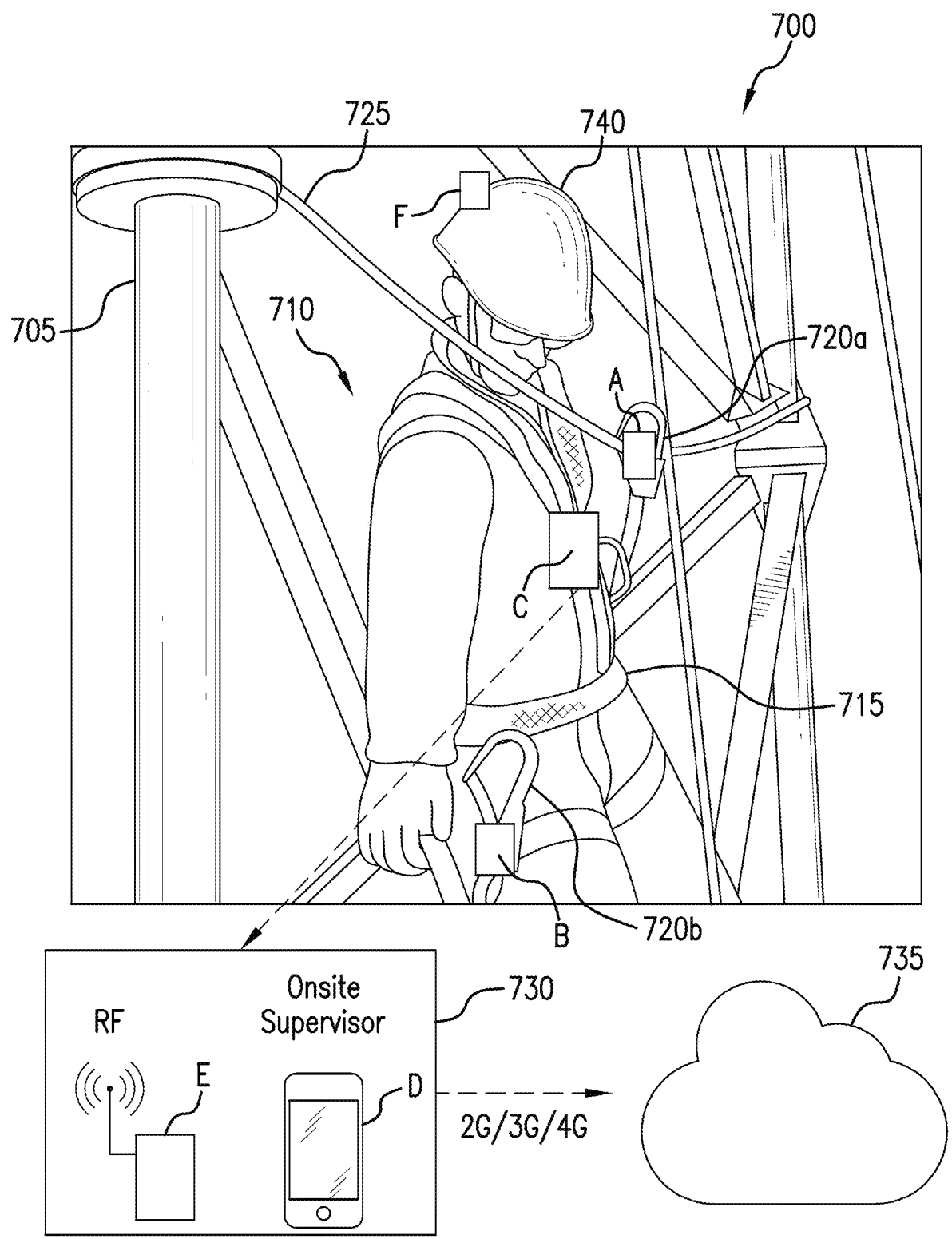
FIG. 7 depicts a perspective view of an exemplary horizontal movement scenario for exemplary smart safety harness and smart rebar hooks.

FIG. 7 depicts a perspective view of an exemplary horizontal movement scenario for exemplary smart safety harness and smart rebar hooks. A use case scenario 700 has a setting of a radio station tower 705. The radio station tower 705 is shown with a worker 710 moving horizontally on the tower 705 to perform routine maintenance. The worker 710 is wearing a safety harness 715 that may be used to prevent falling accidents when the worker is on the tower 705. Coupled to the safety harness 715 are two rebar hooks 720a and 720b having respective hook modules A and B. In the illustration of FIG. 7, the worker 710 is has attached one of the rebar hooks 720a to a support rope 725 fixedly coupled to the tower 705. The hook modules A and B on the respective rebar hooks 720a and 720b include sensors that may measure various parameters used to determine the state of the rebar hooks 720a and 720b. For example, each hook module A and B may include an acceleration sensor to measure the acceleration of each rebar hook 720a and 720b.

Disposed on the safety harness 715 is a module C. The module C includes at least one sensor that may measure various parameters used to determine the state of the worker 710. For example, the module C may include an acceleration sensor to measure the acceleration of the worker 710. These measurements may advantageously be used in determining whether the horizontally moving worker 710 is following proper horizontal movement procedure (e.g., whether the worker 710 is properly coupling the rebar hook 720 to the support rope 725). The module C includes a receiver that can receive wireless signals transmitted from the modules A and B on the rebar hooks 720a and 720b, respectively. The module C may also include a transmitter that can transmit wireless signals to a device associated with an onsite supervisor 730 (e.g., devices D and/or E in FIG. 2). This may advantageously allow for a supervisor using the device D to monitor the state of the worker 710 as they are performing repairs on the tower 705.

The devices D and/or E may communicate with a cloud system 735 via, for example, a wireless (e.g., 2G, 3G, or 4G) link. Data recorded by the sensors in the rebar hooks 720a and 720b and the module C may be forwarded to the cloud data system 735, which may log this data in a database.

Also located on the worker is a module F that may have similar functionality to the module C. For example, the module F may have a sensor(s) (e.g., acceleration sensor), a receiver, and/or a transmitter to receive data signals from the modules A and B and transmit data signals to the devices D and/or E. In some examples, the module F may be used in lieu of the module C (or vice-versa). In various embodiments, the module F may be the same as the module C, but just disposed in a different location relative to the worker 710.

Figure 8:
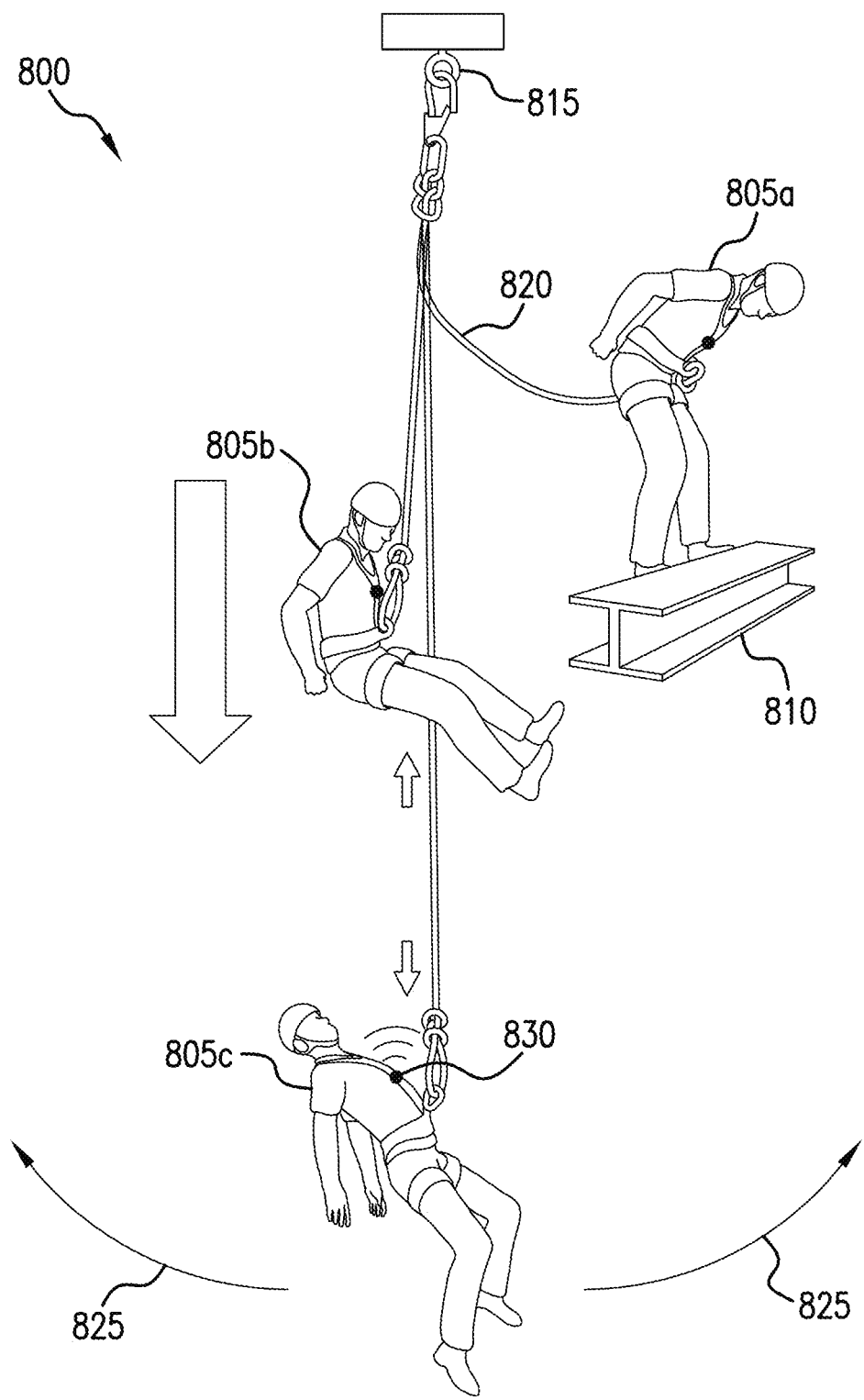
FIG. 8 depicts a perspective view of an exemplary fall scenario.

FIG. 8 depicts a perspective view of an exemplary fall scenario. A fall scenario 800 includes a worker in an unbalanced state 805a. The worker in an unbalanced state 805a is beginning to lose their balance on a beam 810. The worker is coupled to an anchor point 815 via a lanyard 820. When the worker loses their balance on the beam 810, they start to fall, and transition to a falling state 805b. The worker continues to fall, until the slack in the lanyard runs out. At this point, the worker reaches a final fall state 805c, where the worker is dangling from the anchor point 815 and experiencing oscillating pendulum motion 825.

Throughout this falling motion, the module 830 is actively measuring various parameters associated with the falling worker. For example, the module may have an acceleration sensor that may detect the acceleration of the worker. The module may include an air-pressure sensor that measures the air pressure in the local vicinity of the worker, which may be used to calculate changes in the worker's height. These measurements may be used to detect when a fall has taken place. For example, if the acceleration sensor measures an acceleration in the z-axis substantially equal to the acceleration due to gravity (e.g., acceleration≈g=9.8 m/s$^2$) over a certain period of time, it may be assumed that the worker has fallen. The phrase "substantially equal to" in this context may mean on the order of +/−50% of the value of g. In some examples, after the worker reaches the final fall state 805c, the worker may swing back and forth in the air. This oscillatory motion may be detected by the acceleration sensor, and may also indicate that the worker has fallen.

Figure 9:
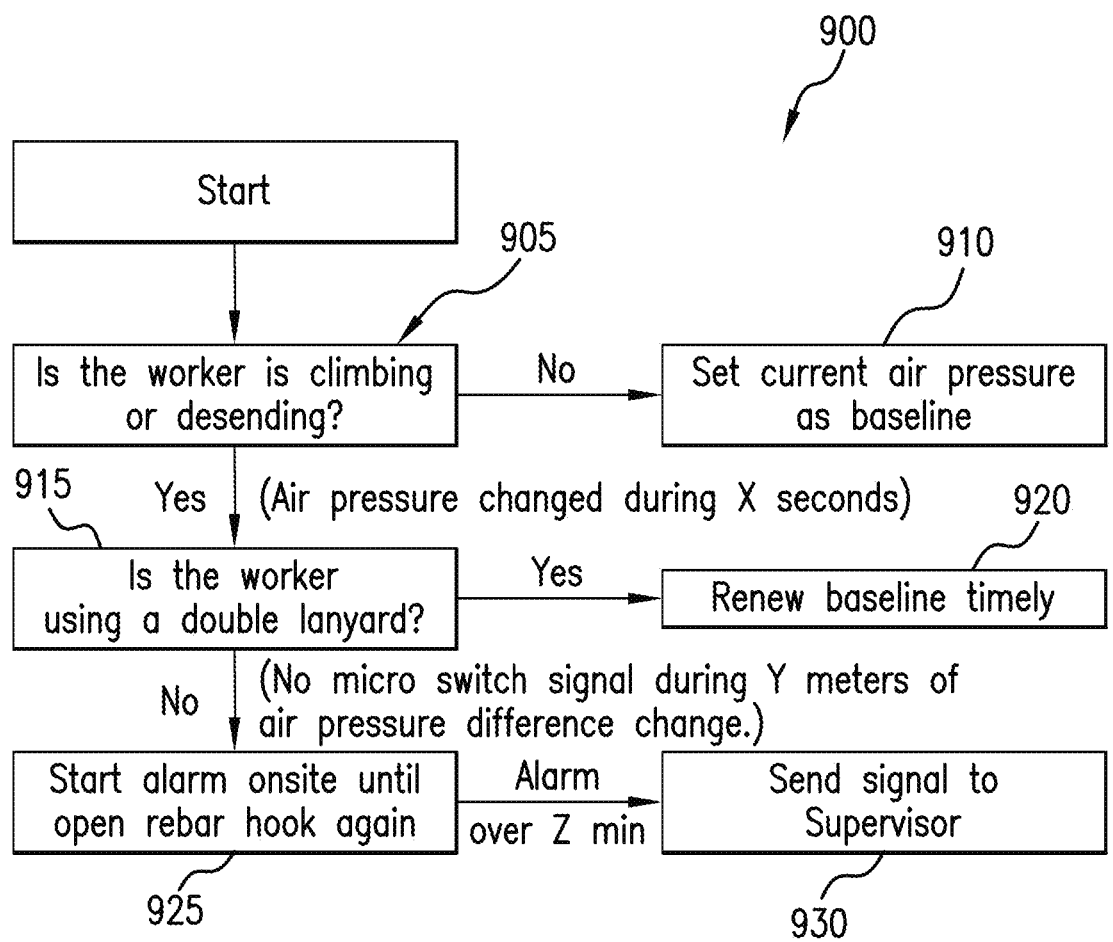
FIG. 9 depicts a flowchart of an exemplary safety system decision tree.

FIG. 9 depicts a flowchart of an exemplary safety system decision tree. A safety system decision tree 900 starts at step 905, which determines whether a worker is climbing or descending. If it is determined that the worker is neither climbing nor descending, then at step 910 the current air pressure (as measured by an air pressure sensor on/in module C) is set as a baseline. If it is determined that the worker is climbing or descending (e.g., because the air pressure has changed a minimum amount during a given time period), then step 915 determines whether the worker is using a double lanyard. If it is determined that the worker is using the double lanyard, then at step 920 the air pressure baseline is timely renewed/updated as the worker is climbing/descending.

If it is determined that the worker is not using the double lanyard (e.g., because there has been no change in the micro-switch signal during a minimum change in altitude as measured by the air pressure sensor), then at step 925 an alarm (e.g., buzzer) starts onsite until the rebar hook is opened. In some examples, the determination of whether the worker is using the double lanyard may be based on changes in a hook gate sensor signal (e.g., magnetic field sensor 605). The alarm may advantageously remind the worker to use proper hook/lanyard protocol. If the alarm is on for more than a given period of time (e.g., over Z minutes), then at step 930 an alert signal is sent to the supervisor alerting them that the worker is not using the double lanyard properly while climbing/descending. This alert signal may advantageously notify the supervisor that one of their subordinates is not using proper hook/lanyard protocol.

The baseline set and renewed in steps 910 may be used in calculating an "air pressure change during X seconds," or in calculating "Y meters air pressure difference change," as shown in FIG. 9. For example, an initial air pressure value may be set as the baseline (e.g., step 910). When the air pressure value changes, the method 900 may compare the changed air pressure value against the baseline and calculate a difference (delta) value. If the difference value exceeds a certain threshold value, then data from other sensors may be checked (e.g., in step 915, the method 900 checks the number of micro-switch/magnetic field sensor signals). This checking step may function like a judgment trigger. For example, if the height as measured by the air pressure sensor has changed over 1.5 meters with no change in the state of the hook gate sensor signal, then it may be judged that a worker has violated proper hook/lanyard safety rules. Once the method 900 has set the baseline, it may compare the baseline against a (rapid) change in height to determine whether the user is actually using the hook/lanyard.

Figure 10:
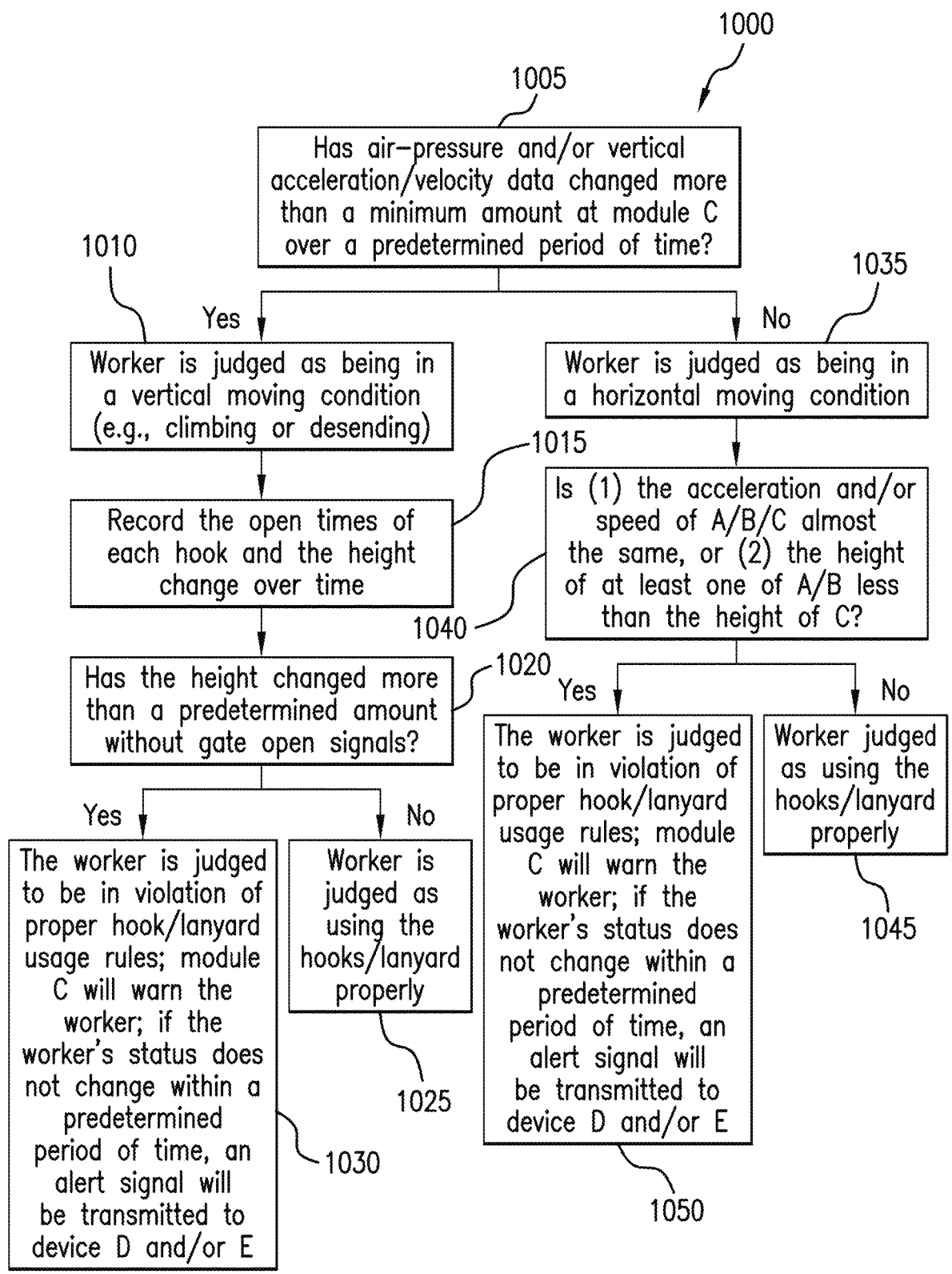
FIG. 10 depicts a flowchart of an exemplary user moving condition decision tree.

FIG. 10 depicts a flowchart of an exemplary user moving condition decision tree. A moving condition decision tree 1000 begins with a step 1005 of determining whether air-pressure and/or acceleration data has changed more than a minimum amount at module C over a predetermined period of time. If the air-pressure and/or acceleration data has changed more than a minimum amount during a predetermined period of time, then at step 1010 the worker is judged as being in a vertical moving state. Next, at step 1015, the open times of each rebar hook are recorded, along with the height change over time.

Next, at step 1020, it is determined whether the height has changed more than a predetermined amount without a gate open signal. If the height has not changed more than a predetermined amount without a gate open signal, then at step 1025 the worker is judged as using the hooks/lanyard properly. If the height has changed more than a predetermined amount without a gate open signal, then at step 1030 the worker is judged to be in violation of proper hook/lanyard usage rules. As a result, the module C will warn the worker of improper safety protocol, and if the worker does not rectify the improper safety protocol after a certain period of time, an alert signal will be transmitted to devices D and/or E.

If, at step 1005, the air-pressure and/or acceleration data has not changed more a minimum amount at module C over a predetermined period of time, then at step 1035 the worker is judged as being in a horizontal moving state. Next, at step 1040, it is determined whether (1) the acceleration and/or speed of modules A/B/C is substantially the same (signifying that the hooks are being carried on the harness), or (2) the height of AB is less than the height of C. If the answer is "no," then at step 1045 the worker is judged as using the hooks/lanyard properly. If the answer is "yes," (e.g., either (1) or (2) is true), then at step 1050 the worker is judged to be in violation of proper hook/lanyard usage rules. As a result, the module C will warn the worker of improper safety protocol, and if the worker does not rectify the improper safety protocol after a certain period of time, an alert signal will be transmitted to devices D and/or E. The phrase "substantially the same" in this context may mean a relative difference of about plus or minus 1%, 2%, 5%, 10%, 20%, or about at least 30% or more between the acceleration and/or speed of modules A/B/C.

An exemplary scenario of the steps laid out in FIG. 10 is as follows: A worker on the ground begins to climb a tower to perform routine maintenance. As the worker is scaling the tower, the air pressure and/or vertical acceleration/velocity data (as measured at module C) is changing more than a certain amount over time. These measurements indicate that a worker is in a vertical moving condition (e.g., the answer at step 1005 is "yes"). At this point, the open times of the hooks coupled to the worker's safety harness are being recorded and logged, along with the change in height of the worker (e.g., as measured by the air pressure sensor in module C). As the worker is scaling a ladder on the tower, the worker successively attaches the hooks at points above the worker's center of gravity. As such, the open times of the hooks are occurring with a relatively high frequency as the workers height increases. These frequent open hook times indicate that the worker is properly using the hooks as the worker climbs up the tower (e.g., the answer at step 1020 is "no").

After the worker reaches a certain height, the worker stops their vertical movement and start moving horizontally. In this horizontal moving state, the air pressure and/or vertical acceleration/velocity data (as measured at module C)

changes a very small amount (e.g., close to zero) over time. These measurements indicate that a worker is in a horizontal moving condition (e.g., the answer at step 1005 is "no"). Now, because the worker is in a hurry, the worker hooks the rebar hooks to their safety harness and moves horizontally without attaching the hooks to anchor points supported by the tower. Because the rebar hooks are hooked to the worker and not to an anchor point, the acceleration of modules A and B on the rebar hooks is nearly equal to the acceleration of module C on the worker's safety harness. These measurement indicate that a worker is not properly using the hook/lanyard (e.g., the answer at step 1040 is "yes"). As a result, an alert element in module C (e.g., a buzzer) will warn the worker that the worker is not using proper safety protocol. As the worker is still in a hurry, the worker decides to ignore the warning, and after a certain period of time, module C transmits an alert signal to the worker's supervisor (e.g., to the device D being used by the supervisor).

After the worker is done performing maintenance, the worker begins descending down the tower. As the worker is descending, the air pressure and/or vertical acceleration data (as measured at module C) is changing more than a certain amount over time. These measurements indicate that a worker is in a vertical moving condition (e.g., the answer at step 1005 is "yes"). At this point, the open times of the hooks coupled to the worker's safety harness are recorded and logged, along with the change in height of the worker (e.g., as measured by the air pressure sensor in module C). Because the worker is still in a hurry, the worker decides to leave their hooks hooked to their safety harness.

As the worker descends, there are no open times of the hook recorded, as the worker has decided to throw caution to the wind and not to couple the hooks to anchor points as the worker descends. As such, the open times of the hooks are occurring with zero frequency as the workers height decreases. The lack of open hook times indicate that the worker is not properly using the hooks as the worker descends down the tower (e.g., the answer at step 1020 is "yes"). As a result, an alert element in module C (e.g., a buzzer) will warn the worker that the worker is not using proper safety protocol. At this point, the worker decides to heed the warning, and begins to anchor the hooks as the worker descends down the tower. Because the worker's status has changed at this point (e.g., open times of the hooks are occurring with a high enough frequency), the alert element in module C turns off, and the worker's supervisor does not receive an alert signal (as the worker has rectified the improper hook/lanyard usage).

Figure 11:
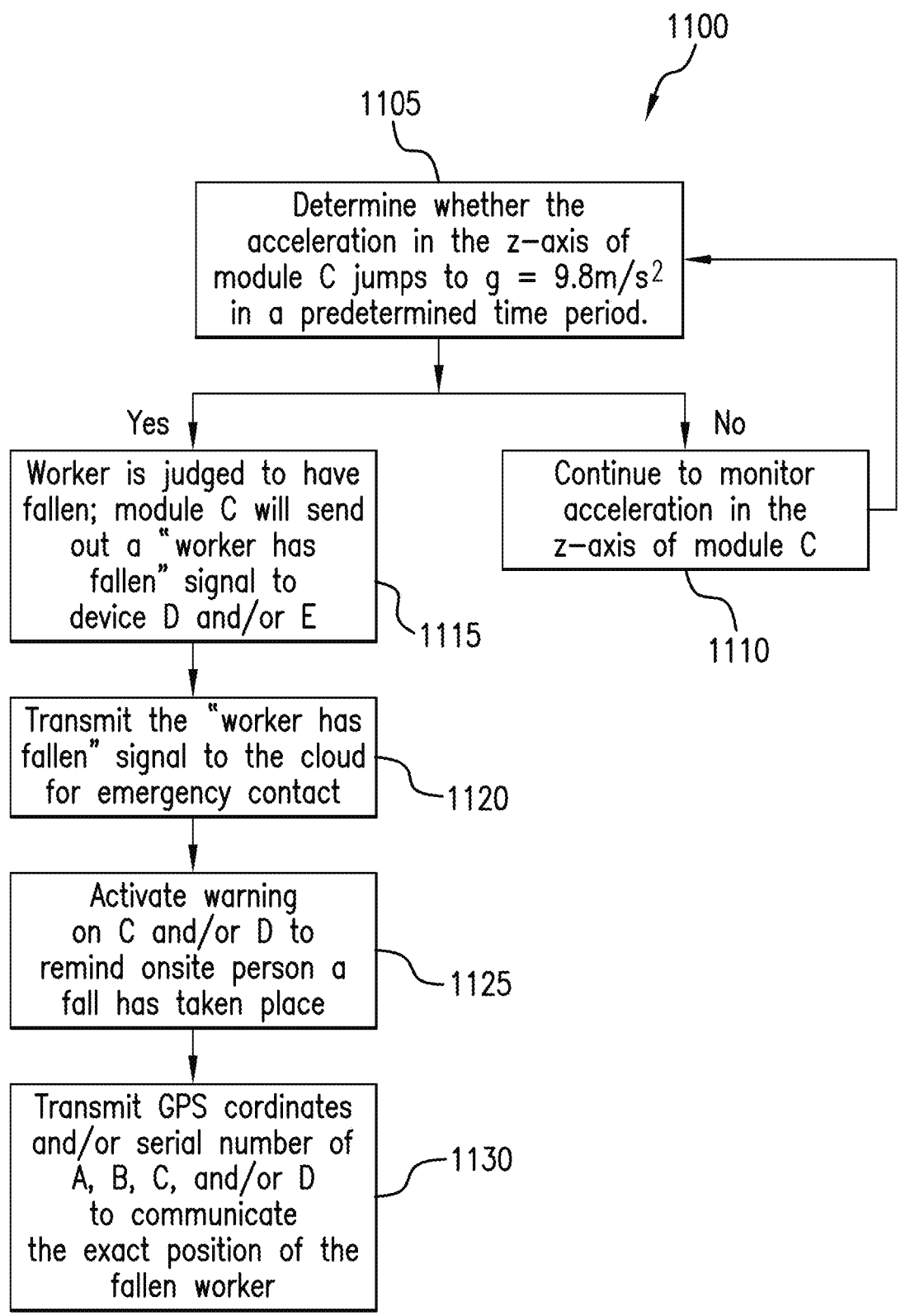
FIG. 11 depicts a flowchart of an exemplary user fall decision tree.

FIG. 11 depicts a flowchart of an exemplary user fall decision tree. The fall decision tree 1100 starts with determining at step 1105 whether the acceleration in the z-axis of module C jumps to substantially $g=9.8$ m/s$^2$ over a certain period of time. If the acceleration in the z-axis of module C does not jump to $g=9.8$ m/s$^2$ over a certain period of time, then at step 1110 the acceleration in the z-axis of module C continues to be monitored. The phrase "substantially" in this context may mean that the acceleration in the z-axis of module C is plus or minus 1%, 2%, 5%, 10%, 20%, or 30% the actual value of g.

If the acceleration in the z-axis of module C does jump to substantially $g=9.8$ m/s$^2$ over a certain period of time, then at step 1115 the worker is judged to have fallen. The module C will then send out a "worker has fallen" signal to devices D and/or E. Next, at step 1120, the devices D and/or E will transmit the "worker has fallen" signal to the cloud for emergency contact. Next, at step 1125, a warning will be activated on module C and/or devices D or E to remind an onsite person that a fall has taken place. Next, at step 1130, the serial number of modules A, B, C, and/or device D and/or the GPS coordinates of module C are transmitted to the cloud and/or emergency contacts to communicate the exact position of the fallen worker.

In some examples, the order of the steps described in FIG. 11 may be performed in a different order, and some steps may be optional. For example, step 1130 may occur before step 1125. In various embodiments, the "worker has fallen" signal may only be sent to device D and/or E and not to the cloud (e.g., step 1120 may be left out).

In various embodiments, after the worker is arrested by an energy absorber after falling, the worker may swing in the air (e.g., oscillating pendulum motion 825 shown in FIG. 8). As such, the acceleration, speed, and angle of the acceleration sensor in module C will exhibit periodic properties, which may be used to judge that the worker has fallen and is suspended in the air by a lanyard connected at an anchor point. Such swinging motion may be used to determine whether a worker has fallen in step 1105.

Figure 12:
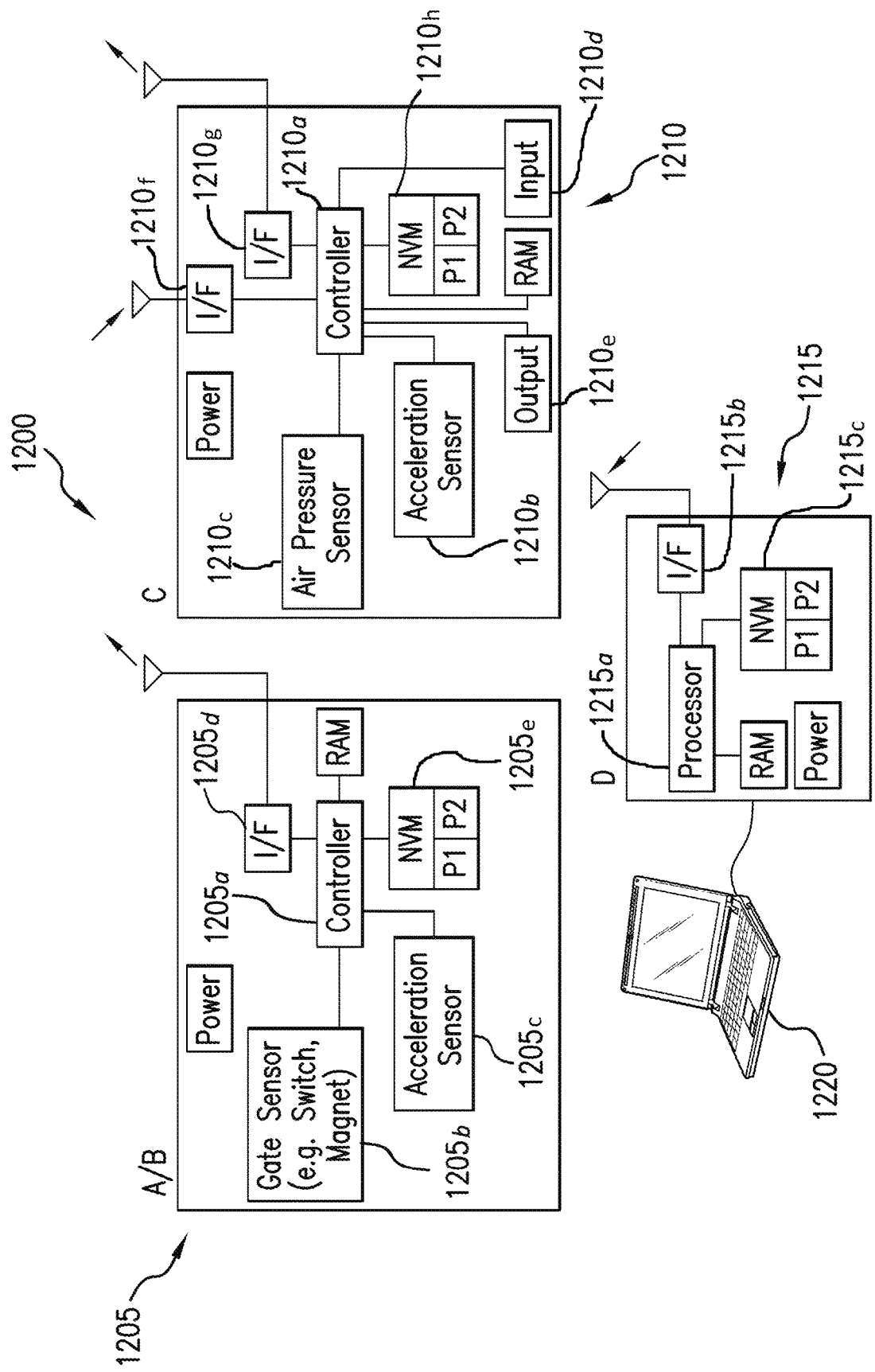
FIG. 12 depicts a block diagram of an exemplary smart hook system, an exemplary smart safety harness system, and an exemplary supervisory monitoring system.

FIG. 12 depicts a block diagram of an exemplary smart hook system, an exemplary smart safety harness system, and an exemplary supervisory monitoring system. A safety system 1200 includes a smart hook system 1205. Each rebar hook (e.g., hook modules A and B) may have at least some of the components of the smart hook system 1205. The smart hook system 1205 includes a controller (e.g., processor), non-volatile memory (NVM), random access memory (RAM), an input/output interface (I/F), a gate sensor (e.g., micro-switch, magnetic field sensor), an acceleration sensor (e.g., accelerometer), and a power source.

The gate sensor of 1205 may detect various parameters associated with the gate of the rebar hook. For example, a micro-switch or magnetic field sensor may be used to detect opening and closing of the rebar hook. The acceleration sensor of 1205 may detect the acceleration of the rebar hook, which may indirectly be used to calculate the velocity and height changes of the rebar hook as well. The data readings from the gate sensor and acceleration sensor of 1205 are communicated to the controller of 1205, which may perform various processing functions to the data readings. For example, the controller of 1205 may perform statistical filtering of the data to remove outliers from acceleration readings. The NVM of 1205 contains program instructions (e.g., P1, P2) that may be executed by the controller of 1205. The controller of 1205 sends the data readings from the sensors to the I/F of 1205, which wirelessly transmits the data readings (e.g., to module C) via a transmitter of 1205.

In some examples, the smart hook system 1205 may not include a controller, RAM, or NVM. In such examples, the measurements made by the sensor and acceleration sensor of 1205 may be transmitted directly to module C without being processed locally at 1205.

The safety system 1200 further includes a smart safety harness system 1210. The module C may have at least some of the components of the smart safety harness system 1210. The smart safety harness system 1210 includes a controller (e.g., processor), non-volatile memory (NVM), random access memory (RAM), at least one input/output interface (I/F), an air pressure sensor, an acceleration sensor (e.g., accelerometer), output, and a power source.

At least one I/F of 1210 may receive signals transmitted from the I/F of 1205. This may allow the controller of 1210 to perform various calculations with both the sensor readings of 1205 and the sensor readings of 1210. For example, the acceleration data measured at 1205 may be compared to the acceleration data measured at 1210 to determine whether a rebar hook is connected to an anchor point or whether the rebar hook is hooked to a worker's safety harness (see, e.g., step 1040 in FIG. 10).

The NVM of 1210 contains program instructions (e.g., P1, P2) that may be executed by the controller of 1210. The NVM of 1210 may contain instructions that allow the controller of 1210 to perform operations corresponding to the steps in FIGS. 9-11. For example, the NVM of 1210 may have instructions that may be used to perform various calculations with the sensor readings of 1205 and/or the sensor readings of 1210. The NVM of 1210 may also include thresholds (e.g., time, height, acceleration threshold) that may be used to determine whether to activate an alarm or send a warning signal. For example, the NVM of 1210 may have instructions that, when executed by the controller of 1210, determine whether the acceleration in the z-axis of module C jumps to $g=9.8$ m/s$^2$ over a threshold time period (see, e.g., step 1105 in FIG. 11). If this occurs, then the controller of 1210 may send out an alert signal to a worker's supervisor (e.g., via the at least one I/F of 1210) apprising them that the worker has fallen.

The safety system 1200 further includes a supervisory monitoring system 1215. The device D may have at least some of the components of the supervisory monitoring system 1215. The supervisory monitoring system 1215 includes a processor, non-volatile memory (NVM), random access memory (RAM), an input/output interface (I/F), and a power source.

At least one I/F of 1215 may receive signals transmitted from the I/F of 1210. This may allow the processor of 1215 to perform various calculations with both the sensor readings of 1205 and the sensor readings of 1210. For example, the acceleration data and hook open times measured at 1205 may be used by the processor of 1215 to determine whether the height of the hooks has changed more than a given distance: without a gate open signal (see, e.g., step 1020 in FIG. 10).

The NVM of 1215 contains program instructions (e.g., P1, P2) that may be executed by the processor of 1215. The NVM of 1215 may contain instructions that allow the processor of 1215 to perform operations corresponding to the steps in FIGS. 9-11. For example, the NVM of 1215 may have instructions that may be used to perform various calculations with the sensor readings of 1205 and/or the sensor readings of 1210. The NVM of 1215 may also include thresholds (e.g., time, height, acceleration threshold) that may be used to determine whether to activate an alarm or send a warning signal. For example, the NVM of 1215 may have instructions that, when executed by the processor of 1215, determine whether the acceleration in the z-axis of module C jumps to $g=9.8$ m/s$^2$ over a threshold time period (see, e.g., step 1105 in FIG. 11). If this occurs, then the processor of 1215 may send out an alert signal to a cloud system and/or emergency contacts apprising them that the worker has fallen.

The supervisory monitoring system 1215 may be coupled to a supervisor device 1220. Data, alerts, warnings, and other information transmitted from the supervisory monitoring system 1215 may be output to the supervisor device 1220. Furthermore, the supervisory monitoring system 1215 and/or supervisor device 1220 may send information to a cloud system and/or emergency contacts. In some examples, the supervisory monitoring system and supervisor computing device are one and the same. For example, the supervisor device 1220 may be a smartphone or laptop that includes the components of the supervisory monitoring system 1215.

Figure 13:
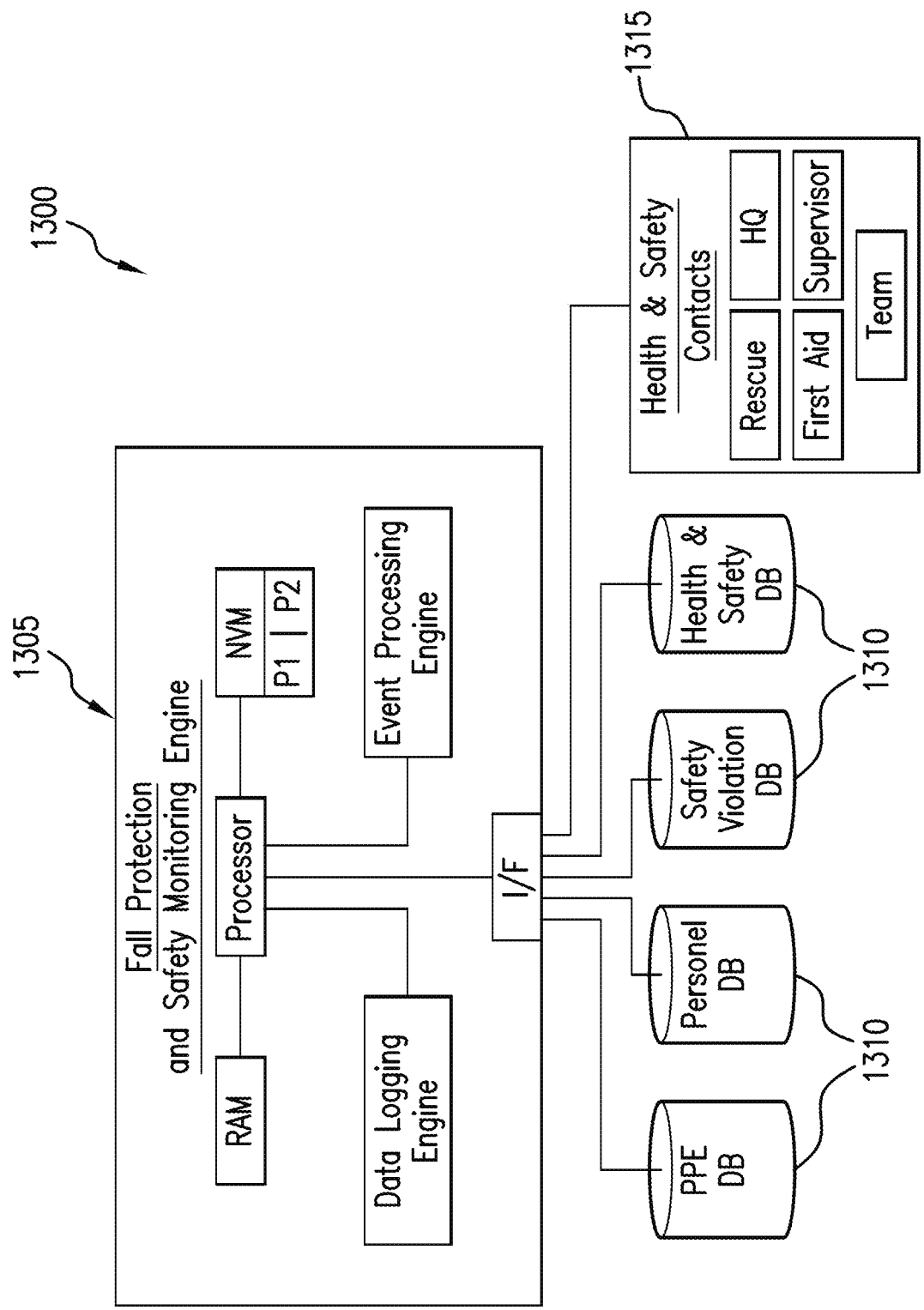
FIG. 13 depicts a block diagram of an exemplary fall protection and safety monitoring engine.

FIG. 13 depicts a block diagram of an exemplary fall protection and safety monitoring engine. A fall protection and safety monitoring system 1300 includes a fall protection and safety monitoring engine 1305. The fall protection and safety monitoring engine 1305 includes a processor, NVM, RAM, an event processing engine, a data logging engine, and an I/F. The I/F is communicatively coupled to multiple databases 1310, as well as health and safety contacts 1315.

In some examples, the fall protection and safety monitoring engine 1305 may be located in the cloud system corresponding to element 150 in FIG. 1, element 315 in FIG. 3, or element 735 in FIG. 7. For example, the fall protection and safety monitoring engine 1305 may receive data from devices D and/or E, and may log this data using the data logging engine. The event processing engine may be configured to receive event data (e.g., alerts, warnings) from devices D and/or E, and may respond to these events in specific ways. For example, if a "worker has fallen" alert is received at the fall protection and safety monitoring engine 1305, the event processing engine may send a "worker has fallen" notification to the health and safety contacts 1315. The notification may include, among other things, the location of the fallen worker, time of fall, sensor data, and/or worker health profile.

The multiple databases 1310 include a personal protective equipment (PPE) database, a personnel database, a safety violation database, and a health and safety database. The personal protection equipment database may include data pertaining to the PPEs deployed out in the field. For example, the PPE database may contain information about how long a PPE device has been deployed out in the field, whether a PPE device has been associated with any past safety issues, and/or the make/model of a PPE device. The personnel database may include data pertaining to the safety workers. For example, the personnel database may contain the names, phone numbers, addresses, and/or health profile of workers deployed in the field. The safety violation database may include data pertaining to past safety violations committed by safety workers. For example, the safety violation database may contain the number of safety violations committed by a worker, the nature of the safety violation, and/or the dates on which the safety violations occurred. The health and safety database may include data that may broadly relate to the health and safety of workers.

The health and safety contacts 1315 include rescue contacts, headquarters, first aid, supervisor, and/or teammates. Whenever a worker has an accident on site (e.g., when a worker has fallen), the fall protection and safety monitoring engine 1305 may alert the health and safety contacts 1315 of the accident. The health and safety contacts 1315 may then respond accordingly (e.g., by sending an ambulance or rescue helicopter to the site, or deploying team members to retrieve the fallen worker).

Although various embodiments have been described with reference to the figures, other embodiments are possible. For example, the output element in module C (FIG. 12 at 1210) may be a buzzer that may vibrate when an alert condition is met. The output element may be a speaker that may receive audio signals from a supervisor talking into the device D. The output element may be an audible alarm that makes an alarm noise when an alert condition is met.

In some examples, a smart hook system may generate a reminder to properly use the smart hook. The smart hook system may also monitor a user to ensure correct operation. In some examples, the smart hook system may include various electronic components, a software application (APP), and remote control. The smart hook system may help to avoid the dangers of people not correctly using a hook and lanyard. For example, it is very dangerous to not use a hook and lanyard when a person is climbing up to a high place. Because it decreases the ascend/descend speed, people may not use the hook and lanyard. The smart hook system may provide a strong incentive for a person to properly use a hook and lanyard.

In some examples, only one rebar hook may be employed (e.g., a safety harness using a single lanyard and hook rather than a double lanyard and hook; see, e.g., FIG. 8). In various embodiments, the processing of data may take place at different locations. For example, data may be pre-processed at the hook modules A and B (e.g., element 1205, FIG. 12). This may allow for less computational power at other data processing locations. Data may be processed at module C (e.g., element 1210, FIG. 12). This, may allow for modules A and B to still perform their function without a processor/RAM/NVM. Data may be processed at a remote computing device (e.g., device D, element 1215, FIG. 12). This may allow for the bulk of processing power to be employed at a location remote from a field-deployed worker. Data may be processed in the cloud system (e.g., safety monitoring engine 1305, FIG. 13, element 150 in FIG. 1, element 315 in FIG. 3, or element 735 in FIG. 7). This may allow for tracking the activities of multiple workers deployed at different locations.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A safety monitoring apparatus comprising:
   a monitoring module configured to couple to a safety harness, the monitoring module comprising:
      a main acceleration sensor;
      an air pressure sensor;
      a controller coupled to the main acceleration sensor and configured to receive sensor readings from the main acceleration sensor, the controller also coupled to the air pressure sensor and configured to receive sensor readings from the air pressure sensor;
      a receiver coupled to the controller; and
   a first rebar hook comprising:
      a first acceleration sensor;
      a first hook sensor configured to detect an open-closed state of the first rebar hook; and
      a first rebar hook transmitter coupled to the first acceleration sensor and first hook sensor, the first rebar hook transmitter configured to transmit sensor readings from the first acceleration sensor and the first hook sensor to the receiver of the monitoring module,
      wherein the first rebar hook is configured to couple to a distal end of a lanyard, and the lanyard is configured to couple at a proximal end to the safety harness, and
      wherein the first hook sensor comprises a magnetic field sensor, and the first rebar hook further comprises a first magnetic field generator that cooperates with the first hook sensor to detect the open-closed state of the first rebar hook.

2. The safety monitoring apparatus of claim 1, wherein the magnetic field sensor comprises a Hail-effect sensor.

3. The safety monitoring apparatus of claim 1, wherein the monitoring module further comprises a non-transitory computer readable medium containing instructions that, when executed, cause the controller to perform operations comprising:
   determining whether vertical sensor readings from the main acceleration sensor have changed more than a minimum amount over a predetermined period of time;
   if the sensor readings from the main acceleration sensor have changed more than a minimum amount over a predetermined period of time, then assuming that a worker wearing the safety harness is in a vertical moving position;
   recording the changes in the open-closed states of the first hook sensor over a time span;
   determining whether a change in height as measured by the air pressure sensor has changed by more than a threshold height amount over the time span; and
   if the change in height as measured by the air pressure sensor has changed by more than a threshold height amount over the time span, then generating a violation signal indicative of the worker improperly using the first rebar hook.

4. The safety monitoring apparatus of claim 1, wherein the monitoring module further comprises a non-transitory computer readable medium containing instructions that, when executed, cause the controller to perform operations comprising:
   determining whether vertical sensor readings from the main acceleration sensor have changed more than a minimum amount over a predetermined period of time;
   if the sensor readings from the main acceleration sensor have not changed more than a minimum amount over a predetermined period of time, then assuming that a worker wearing the safety harness is in a horizontal moving position;
   determining whether an acceleration reading of the main acceleration sensor is substantially the same as an acceleration reading of the first acceleration sensor; and
   if an acceleration reading of the main acceleration sensor is substantially the same as an acceleration reading of the first acceleration sensor, then generating a violation signal indicative of the worker improperly using the first rebar hook.

5. The safety monitoring apparatus of claim 1, wherein the monitoring module further comprises a main transmitter coupled to the controller and configured to transmit signals to a remote computing device.

6. The safety monitoring apparatus of claim 5, wherein the monitoring module further comprises a non-transitory computer readable medium containing instructions that, when executed, cause the controller to perform operations comprising:
   determining whether the vertical sensor readings from the main acceleration sensor have been substantially equal to a local gravitational acceleration for more than a predetermined period of time;
   if the vertical sensor readings from the main acceleration sensor have been substantially equal to a local gravitational acceleration for more than a predetermined period of time, then assuming that a worker wearing the safety harness has fallen; and
   transmitting to the remote computing device, via the main transmitter, an alert signal indicating that the worker wearing the safety harness has fallen.

7. The safety monitoring apparatus of claim 5, wherein the main transmitter is configured to wirelessly transmit the sensor readings from the main acceleration sensor, the first acceleration sensor, and the first hook sensor to the remote computing device.

8. The safety monitoring apparatus of claim 7, wherein the main transmitter is configured to wirelessly transmit signals to the remote computing device via a radio frequency channel.

9. The safety monitoring apparatus of claim 1, wherein the first rebar hook transmitter is configured to transmit sensor readings from the first acceleration sensor and first hook sensor to the receiver of the monitoring module via a Bluetooth wireless channel.

10. A safety monitoring apparatus comprising:
a monitoring module configured to couple to a safety harness, the monitoring module comprising:
   a main acceleration sensor;
   a controller coupled to the main acceleration sensor and configured to receive sensor readings from the main acceleration sensor; and
   a receiver coupled to the controller,
a first rebar hook comprising:
   a first acceleration sensor;
   a first hook sensor configured to detect an open-closed state of the first rebar hook; and
   a first rebar hook transmitter coupled to the first acceleration sensor and first hook sensor, the first rebar hook transmitter configured to transmit sensor readings from the first acceleration sensor and the first hook sensor to the receiver of the monitoring module,
   wherein the first rebar hook is configured to couple to a distal end of a lanyard, and the lanyard is configured to couple at a proximal end to the safety harness, and
   wherein the first hook sensor comprises a magnetic field sensor, and the first rebar hook further comprises a first magnetic field generator that cooperates with the first hook sensor to detect the open-closed state of the first rebar hook.

11. The safety monitoring apparatus of claim 10, wherein the magnetic field sensor comprises a Hail-effect sensor.

12. The safety monitoring apparatus of claim 10, wherein the monitoring module further comprises a main transmitter coupled to the controller and configured to transmit signals to a remote computing device.

13. The safety monitoring apparatus of claim 12, wherein the main transmitter is configured to wirelessly transmit the sensor readings from the main acceleration sensor, the first acceleration sensor, and the first hook sensor to the remote computing device.

14. The safety monitoring apparatus of claim 13, wherein the main transmitter is configured to wirelessly transmit signals to the remote computing device via a radio frequency channel.

15. The safety monitoring apparatus of claim 10, wherein the first rebar hook transmitter is configured to transmit sensor readings from the first acceleration sensor and first hook sensor to the receiver of the monitoring module via a Bluetooth wireless channel.

16. A safety monitoring apparatus comprising:
a monitoring module configured to couple to a safety harness, the monitoring module comprising:
   a main acceleration sensor;
   a controller coupled to the main acceleration sensor and configured to receive sensor readings from the main acceleration sensor; and
   a receiver coupled to the controller; and
a first rebar hook comprising:
   a first acceleration sensor;
   a sensor configured to detect an open-closed state of the first rebar hook; and
   a first rebar hook transmitter coupled to the first acceleration sensor, the first rebar hook transmitter configured to transmit sensor readings from the first acceleration sensor to the receiver of the monitoring module, the first rebar hook transmitter also configured to transmit the open-closed state of the first rebar hook to the receiver of the monitoring module,
   wherein the first rebar hook is configured to couple to a distal end of a lanyard, and the lanyard is configured to couple at a proximal end to the safety harness, and
   wherein the first hook sensor comprises a magnetic field sensor, and the first rebar hook further comprises a first magnetic field generator that cooperates with the first hook sensor to detect the open-closed state of the first rebar hook.

17. The safety monitoring apparatus of claim 16, wherein the monitoring module further comprises a main transmitter coupled to the controller and configured to transmit signals to a remote computing device.

18. The safety monitoring apparatus of claim 17, wherein the main transmitter is configured to wirelessly transmit signals to the remote computing device via a radio frequency channel.

* * * * *